United States Patent [19]
Koren

[11] 3,779,454
[45] Dec. 18, 1973

[54] SLIDE RULE FOR ELECTRONIC ANALYSIS
[75] Inventor: Jan Koren, Bridgeport, Conn.
[73] Assignee: Raymond Lee Organization, Inc., New York, N.Y.
[22] Filed: May 1, 1972
[21] Appl. No.: 249,379

[52] U.S. Cl. .............................. 235/70 A, 235/70 C
[51] Int. Cl. ............................................. G06g 1/02
[58] Field of Search ............... 235/70 R, 70 A, 70 C

[56] References Cited
UNITED STATES PATENTS

| | | | |
|---|---|---|---|
| 887,390 | 5/1908 | Hall | 235/70 A |
| 1,488,823 | 4/1924 | Masurovsky | 235/70 A |
| 1,602,479 | 10/1926 | Bulmer et al. | 235/70 A |
| 2,422,421 | 6/1947 | Kaufman | 235/70 A |

*Primary Examiner*—Stephen J. Tomsky
*Attorney*—Howard I. Podell

[57] ABSTRACT

An improved slide rule containing new graduated scales for calculating from decibels, and nepers, directly into units of voltage, current, impedance, and power.

2 Claims, 3 Drawing Figures

PATENTED DEC 18 1973 3,779,454

SLIDE RULE FOR ELECTRONIC ANALYSIS

BACKGROUND OF THE INVENTION

It is quite customary in the analysis of electronic circuits to calculate values in decibels, DB, and Nepers, Np, and to convert DB and Np to Voltages V, current A, and power and to obtain percentages or relative values, as the case may be. In the past, such calculations have been performed in a tedious manner, either by calculation from formulae, reference to tables, or by means of lengthy calculation with conventional slide rules.

The slide rule designed according to my invention performs these calculations in a rapid manner, and with a minimum of effort.

SUMMARY OF THE INVENTION

The slide rule of my invention has a fixed set of scales and a set of scales on a movable member. The fixed scales include a first scale, a linear scale from −20 to +20 decibels, with zero (0) in the middle of this first scale, and a second scale, a logarithmic scale ranging from 0.1 to 10, with 1.0 in the middle of this second scale. The scales on the movable member include a logarithmic scale ranging from 0.1 to 10 and a linear Nepers scale ranging from −2.5 Np to +2.5 Np, and a linear Nepers scale ranging from −14Np to +14Np.

BRIEF DESCRIPTION OF THE DRAWINGS

The objects and features of my invention may be further understood with reference to the following description of an illustrative embodiment of the invention taken together with the accompanying drawings in which.

DESCRIPTION OF THE PREFERRED EMBODIMENT

Figure 1:
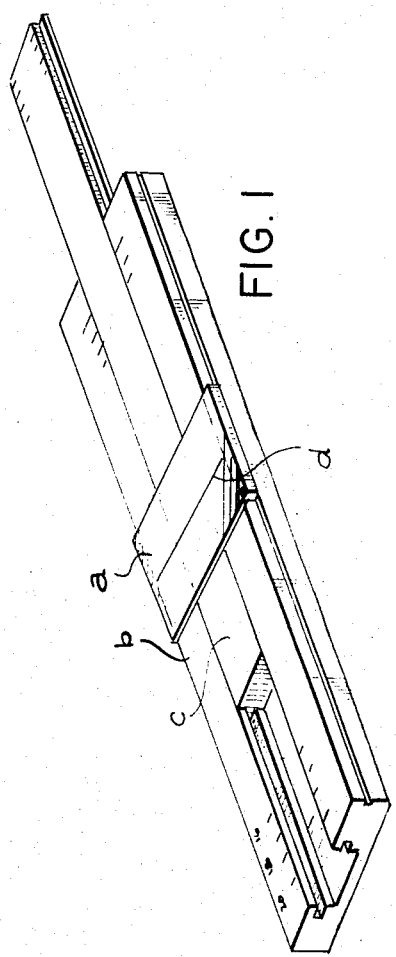
FIG. 1 is a perspective illustration of the invention in the form of a slide rule.

Turning now descriptively to the drawings in which similar reference characters denote similar elements throughout the several views, FIG. 1 illustrates a conventional slide rule mechanism in which a transparent cursor a, slides axially along the length of the fixed member b, and the movable member c slides axially with relation to the fixed member b and the cursor a. The cursor a has a hairline d to line up with the precise numerals on the several scales of both the movable member and the fixed member which are simultaneously intersected by the cursor.

The fixed member b contains a lower scale, "X" with the range of numbers from 0.1 to 10 marked in logarithmic scale, an upper scale "DB" with the numbers −20 to ±20 arranged in linear scale. It is to be noted that numeral −20 of scale "DB" is aligned with numeral 0.1 of scale "X", numeral 0 of scale "DB" and the mid point of that scale, is aligned with numeral 1.0 of scale "X," which is at the midpoint of the "X" scale, and numeral +20 of scale "DB" is aligned with numeral 10 of the "X" scale.

A third scale on the fixed member, powered scale PDB contains the range −10 to +10 so aligned with the DB scale as to represent at any point on the PDB scale a value which is one-half that indicated on the DB scale.

Figure 2:
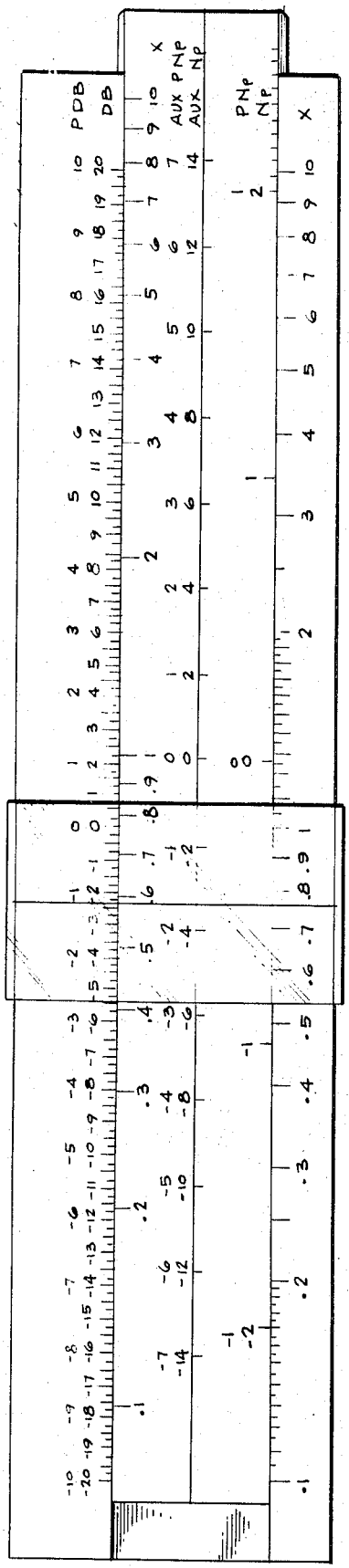
FIG. 2 is a plan view of the slide rule illustrating the several scales on the fixed and the movable members.
Figure 3:
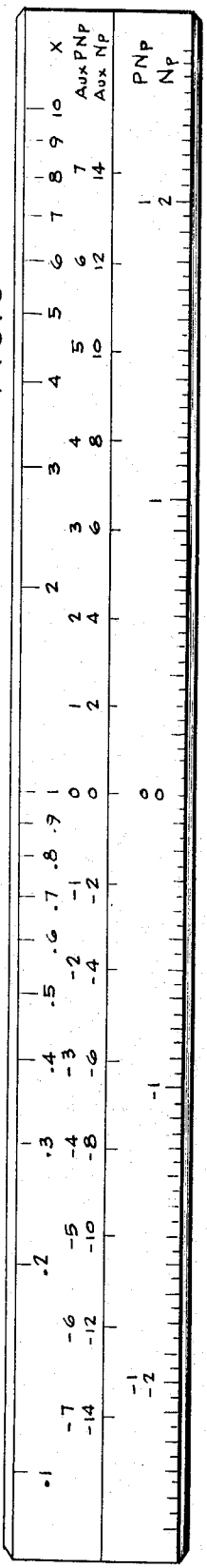
FIG. 3 is a plan view of the movable member of the slide rule.

As shown on FIG. 2 and FIG. 3, there are five scales on the movable member c in the preferred embodiment. The uppermost scale on the movable member is the "X" scale, which is the same scale as the "X" scale described on the fixed member. In the rest position of the slide rule, when the ends of the movable member are aligned with the ends of the fixed member, the hairline d of the cursor will be aligned with the identical setting on the "X" scales of both the fixed and the movable members.

The lowermost scale on the movable member, the "Np" scale contains the range of numbers from −2.5 to +2.5 in linear scale so aligned with the "DB" scale on the fixed member that −2 on the "Np" scale is directly below −17.4 on the "DB" scale, 0 on the "Np" scale is directly below 0 on the "DB" scale and +2 on the "Np" scale is directly below +17.4 on the "DB" scale, in the rest position.

The movable member contains scale "Aux Np" ranging from −14 to +14, scale "aux PNp" ranging from −7 to +7, and scale PNp ranging from −1.25 to +1.25.

The linear "Aux Np" scale ranging from −14 to +14 is so aligned with "DB" scale of the fixed member in the rest position that −14 on the "Aux Np" scale is directly below −18.26 on the "DB" scale, 0 on the "Aux Np" scale is directly below 0 on the "DB" scale, and +14 on the "Aux Np" scale is directly below +18.26 on the "DB" scale.

All powered "PDB," "PNp," "Aux PNp" scales will be one half the reading of the "DB," "Np," "Aux Np" scales, respectively.

The type of calculation that can be readily performed on the slide rule of my invention may be readily perceived from the following illustrative example:

Given: The relative value of a point on the curve of a resonant circuit is 0.7. Calculate this value in decibels (DB).

A. The customary manner is as follows:
$$DB = 20 \log (V_2/V_1)$$
$$DB = 20 \log 0.7/1 = 20 (.845-1)$$
$$DB = -3.1 \text{ (ans.)} \tag{1}$$

B. By use of my invention:
Set the movable section to the rest position such that the "X" scale reads 1 at the point where the "DB" scale reads 0, and read on the "DB" scale opposite 0.7 on the "X" scale. The reading is −3.1 DB.

Example II — Given the information in problem 1 above.
Calculate this value in Nepers (Np).

A. The customary manner is as follows:
$$Np = \ln (V_2/V_1) = \ln (0.7/_1)$$
$$Np = 2.3 \log 0.7 - 2.3 (.845-1)$$
$$Np = 2.3 \times - 0.155 = -0.36 \tag{2}$$

B. By use of my invention:
Set the movable section to the rest position Read on the Np scale opposite 0.7 on the "X" scale. The reading is −0.36 Np (ans.)

Example III — Convert a voltage of 1.1 V to DB where 0 DB is defined as being 0.775 V.

A. By use of my invention, set 0.775 on the "X" scale to 0 on scale "DB" as shown in FIG. 2.

The value of 1.1 V on the "X" scale is now opposite 3 DB on the "DB" scale. (ans.)

B. Similarly for Np:

Set the 0 on the "Np" scale opposite .775 on "X" scale and 1.1 on "X" scale shows us +.35 on "Np" scale. (ans.)

Example IV

A. We measured 1.5 mV at the input and 2.2 V at the output of an amplifier. Find the total amplification in DBs and NPs.

$Z_1 = Z_2$ Output and input impedances are equal.

$DB = 20 \log V_2/V_1 = 20 \log (2.2/1.5 \times 1000)$ $DB = 20 \log 2.2/1.5 + 20 \log 1000 = 20 \log 2.2/1.5 + 60$ We set the number 1.5 on "X" scale opposite 0 on "DB" scale and 2.2 on "X" scale gives us +3.4 DB.

The amplification is $60 + 3.4 = 63.4$ DB. (ans.)

B. Similarly for Np:

$Np = \ln V_2/V_1 = \ln (2.2/1.5 \times 1000) = 2.3 \log 2.2/1.5 + 2.3 \log 1000$ $Np = 2.3 \log 2.2/1.5 + 6.9$ We set 0 on Np scale opposite 1.5 on "X" scale and 2.2 on "X" scale shows us .4 on "Np" scale.

The result will be: $Np = .4 + 6.9 = 7.3$ Np (ans.) Or using "Aux Np" scale for 6.9, we use whole number 6 on "Aux Np" scale set opposite 1.5 on "X" scale and 2.2 on "X" scale shows us 1.3 on "Np" scale.

The result is the same: $Np = 1.3 + 6 = 7.3$ (ans.)

Note: a/ Using "Aux Np" scale we always use whole absolute lower even number, for + 6.9 use +6, for −6.9 use − 6, for − 9.2 use − 8, etc.

b/ Using power "Aux Np" scale we use whole absolute lower number, for − 4.6 use − 4, for − 3.45 use + 3, etc.

Similarly, by use of this slide rule, we can determine the value of noise voltage, damping, amplification and dynamics. We can readily determine from measurements both input and output impedance by means of a single resistance, since the DB and Np deviations are easily calculated on the slide rule.

Since the obvious changes may be made in the specific embodiment of the invention described herein without departing from the spirit or scope thereof, it is indicated that all matter contained herein is intended to be interpreted in an illustrative sense and not a limiting sense.

Having thus described my invention, what I claim as new, and desire to secure by Letters Patent of the United States is:

1. A slide rule consisting of a fixed member and a movable member, with means to keep the two members adjacent to each other, while permitting the movable member to slide relative to the fixed member, with scales marked on each member with one first member being marked with a linear scale ranging from a negative value to zero to a positive value, with the zero value indicated midway between the extremities of said scale, and the second member being marked in a logarithmic scale with the mark corresponding to the value of one being at the mid-point of said logarithmic scale, such that when the movable member is slid to the rest position so that the mark of the zero value of the linear scale or the first member is directly opposite the mark of one of the logarithmic scale of the second member, the mark of one-tenth of the logarithmic scale is directly opposite the mark of negative twenty on the linear scale and the mark of ten on the logarithmic scale is directly opposite the mark of positive twenty on the linear scale.

2. A slide rule as described in claim 1, with an additional scale on the first member marked with the same logarithmic scale as is marked the second member so that, in the rest position, the marks on the logarithmic scale of the first member are directly opposite marks of equal value on the logarithmic scale of the second member.

* * * * *